Feb. 18, 1958     E. E. AYLOR     2,824,202

OVEN HEAT ELEMENT

Filed May 31, 1956

INVENTOR.
Elmo E. Aylor
BY
J. D. Douglas
His atty.

United States Patent Office 2,824,202
Patented Feb. 18, 1958

2,824,202

OVEN HEAT ELEMENT

Elmo E. Aylor, Galesburg, Ill., assignor to Midwest Manufacturing Corporation, Galesburg, Ill., a corporation of Illinois Application May 31, 1956, Serial No. 583,370

4 Claims. (Cl. 219—35)

This invention relates to a heating unit for an electric oven.

The oven on an electric stove commonly is provided with a plug-in heating unit which plugs into a socket at the back of the oven compartment. For proper cooking operation of the oven, it is necessary that the heating unit provide for substantially even heat distribution throughout the oven. At the same time, the heating unit must be so constructed as to make economical its manufacture and assembly on the stove.

These two practical requirements are satisfied in the present invention by a heating unit of novel construction which lends itself to economical manufacture and assembly on the stove and which provides for improved heat distribution within the oven compartment, particularly adjacent its plug-in connection at the back of the oven compartment.

Accordingly, it is an object of the present invention to provide a novel heating unit for an electric oven which provides for improved heat distribution within the oven compartment.

It is also an object of this invention to provide such a heating unit of novel construction which insures adequate heat in the vicinity of its plug-in connection.

Another object of this invention is to provide a heating unit for an electric oven which is of novel construction which enables the unit to be manufactured and assembled in the oven economically.

Other and further objects and advantages of the present invention will be apparent from the following description of a preferred embodiment thereof, which is described in detail hereinafter with reference to the accompanying drawing.

Figure 1:
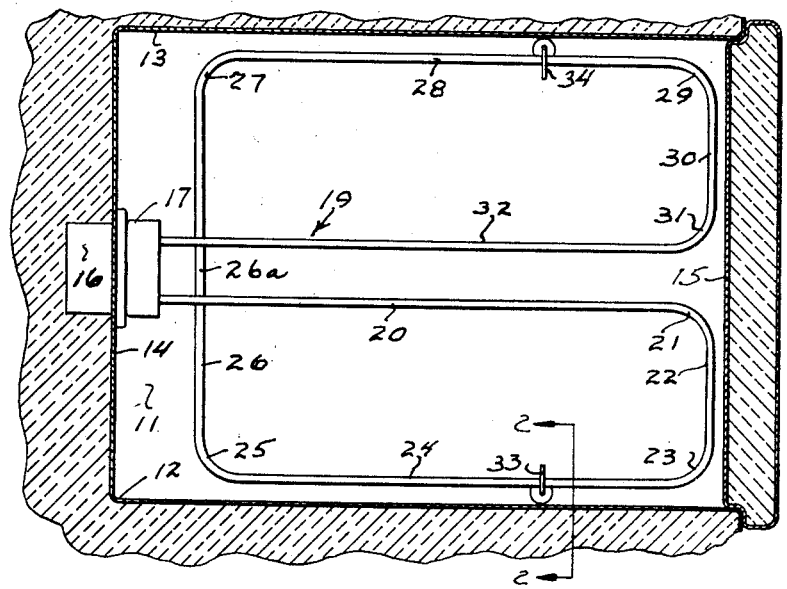
Figure 1 is a section through an oven containing the present heating unit.

Referring to Fig. 1, the oven is provided with a bottom wall 11, opposite side walls 12 and 13, a back wall 14, a front door 15, and a top wall (not shown) which together define a generally cubical oven compartment. Extending through the back wall 14 and supported thereby is an electrical socket 16 for receiving the pronged plug of the heating unit. The socket is connected to a suitable source of electrical power.

The heating unit is made up of a pronged plug 17, which makes electrical connection with the socket, and a heating element, indicated generally at 19, which is of rod-like configuration. The heating element has an elongated straight first segment 20 which projects forward from plug 19 to extend forward within the oven compartment at one side of the center-line of the compartment. At the forward end of segment 20 the heating element is bent back at 21 through a 90° arc to provide a straight second segment 22 projecting outwardly to one side of the first segment 20 to extend along the front of the oven compartment at that side of the compartment. At the outer end of segment 22 the heating element is bent back at 23 through a 90° arc to present a straight third segment 24, which projects rearward from the outer end of segment 22 substantially parallel to segment 20 to extend along that side of the oven compartment. At the back end of segment 24 the heating element is bent back at 25 through a 90° arc and presents a straight fourth segment 26 extending toward the opposite side of the oven compartment substantially parallel to segment 22. Segment 26 extends past segment 20 just below the latter and substantially completely across the back of the oven compartment. At the opposite end of the segment 26 the heating element is bent back at 27 through a 90° arc and presents a forwardly projecting fifth segment 28, which extends substantially parallel to segments 20 and 24 along the opposite side of the oven compartment. The heating element is bent back at 29 through a 90° arc at the forward end of segment 28 to provide a straight sixth segment 30, which projects inward along the front of the oven compartment toward the center-line of the oven compartment. This segment 30 of the heating element terminates short of the center-line of oven compartment. The heating element at the inner end of segment 30 is bent back at 31 through a 90° arc and presents a seventh straight segment 32 which extends substantially parallel to segment 20 at the opposite side of the center-line of the oven compartment back to the plug 17.

Figure 2:
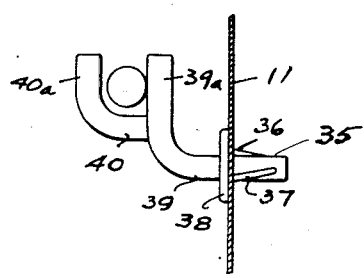
Figure 2 is a section taken along the line 2—2 in Fig. 1 and showing the manner in which the present heating unit is supported within the oven.

The heating element 19 is physically supported at the back of the oven compartment by the plug and socket connection 17, 16. Near the front of the oven compartment the heating element is supported at either side by studs 33 and 34 carried by the bottom wall 11 of the oven. Referring to Fig. 2, each of these studs includes a stem 35 having opposite ribs 36, 37. The stem is inserted down through a complementary hole in the bottom wall 11 and then turned to lock the bracket in place. Each stud is provided with a transverse flat collar 38, which is spaced above the upper ends of the ribs 36 and 37 by substantially the exact thickness of the bottom wall 11 of the oven, so that this collar snugly engages the upper face of this wall when the stud is in place. A rod portion 39 projects up from collar 38 and is bent over at a right angle to provide a horizontal arm 39a spaced a short distance above the bottom wall 11 of the oven. A similar rod member 40 is welded to the inner end of arm 39a and projects up and is bent over at a right angle to provide a horizontal arm 40a overlying arm 39a in spaced relation. The arms 39a, 40a on each stud project inwardly toward the center-line of the oven compartment.

The straight segment 24 which forms one side extremity of the heating element is received snugly between the arms 39a and 40a on stud 33 at that side of the oven compartment in the manner shown in Fig. 2, with the lower arm 39a supporting it from below and the upper arm 40a holding it against displacement upward. The opposite side segment 28 of the heating element is similarly supported by stud 34.

When the heating unit is to be assembled onto the oven, the back ends of the respective side segments 24 and 28 of the heating unit are inserted between the upper and lower arms of the respective supporting studs 33 and 34. The heating unit is then pushed toward the back of the oven compartment, with the studs 33, 34 serving to guide the movement of the heating unit at this time. The plug 17 is then inserted into the socket 16 at the back of the oven and the heating unit is now fully supported within the oven. It will be apparent that this arrangement provides for extremely simple and economical assembly of the heating unit onto the oven.

From the viewpoint of heat distribution within the oven, an extremely important advantage of the present heating unit is the provision of the middle portion 26a of the back segment 26 of the heating element, which extends across the space between the forwardly projecting segments 20 and 32 of the heating unit. In use, the portions of segments 20 and 22 immediately adjacent the plug 17 tend to remain substantially cooler than the remainder of the heating element. However, the middle portion 26a of the back segment 26 of the heating element provides sufficient heat at this region and avoids the tendency to have a cool spot at the middle of the back of the oven compartment due to this effect. As a result, a much improved, more uniform heat distribution throughout the oven compartment is achieved.

Also, it will be apparent that the present heating unit has a minimum number of bends in the heating unit, and this simplified construction makes the unit economical to manufacture and to assemble in the oven. At the same time, proper heat distribution within the oven is not sacrificed since the heating element extends substantially completely around the oven compartment.

Having thus described my invention I am aware that numerous and extensive departures may be made therefrom without departing from the spirit of the invention as defined by the appended claims.

I claim:

1. A heating unit for an electric oven wherein there is an electrical connector for connection to an electrical power source at the back of the oven compartment, said heating unit comprising a heating element for connection to said electrical connector comprising a first pair of forwardly extending elongated segments which are substantially parallel to each other, each of the segments of said first pair at the forward ends being bent outward and extending away from each other to provide a second pair of segments to extend along the front of the oven compartment, each of the segments of said second pair being bent back to provide a third pair of segments to extend along the respective sides of the oven compartment, and each of the segments of the third pair being bent back to provide converging segments to extend along the back of the oven compartment which join each other between said first pair of segments adjacent the back ends of said first pair of segments.

2. A heating unit for an electric oven comprising in combination, an electrical plug for insertion in a socket at the back of the oven compartment, and an electrical heating element comprising a straight first segment connected to the plug and extending forward therefrom, the heating element at the forward end of said first segment being bent back through an arc of substantially 90° and presenting a straight second segment projecting outwardly away from said first segment to extend along the front of the oven compartment at one side thereof, the heating element at the outer end of said second segment being bent back through an arc of substantially 90° and presenting a straight third segment projecting rearwardly away from said second segment to extend back along said one side of the oven compartment, the heating element at the back end of said third segment being bent back through an arc of substantially 90° and presenting a straight fourth segment which projects past said first segment in close proximity to the plug to extend across the back of the oven compartment, the heating element at the other end of said fourth segment being bent back through an arc of substantially 90° and presenting a straight fifth segment projecting forwardly away from said fourth segment to extend along the opposite side of the oven compartment, the heating element at the forward end of said fifth segment being bent back through an arc of substantially 90° and presenting a straight sixth segment projecting inward from said fifth segment to extend along the front of the stove at said opposite side thereof, the heating element at the inner end of said sixth segment being bent back through an arc of substantially 90° short of said first segment and presenting a straight seventh segment which extends substantially parallel to said first segment back to the plug.

3. In combination, an electric oven having a back wall and spaced side walls, a socket on the back wall of the oven, and a heating unit for the oven comprising an electrical plug for insertion in said socket, and a heating element connected to said plug and comprising a first pair of elongated segments extending forward from the plug substantially parallel to each other, each of the segments of said first pair at the forward ends being bent outward and extending away from each other to provide a second pair of segments which extend along the front of the oven, each of the segments of said second pair being bent back to provide a third pair of segments which extend along the respective sides of the oven, and each of the segments of the third pair being bent back to provide converging segments which extend along the back of the oven and which join each other between said first pair of segments in close proximity to the plug.

4. In combination, an electric oven having a back wall and spaced side walls, a socket on said back wall, and a heating unit for the oven comprising an electrical plug for insertion in the socket, and an electrical heating element having a straight first segment connected to the plug and extending therefrom along the middle of the oven, the heating element at the forward end of said first segment being bent back through an arc of substantially 90° and presenting a straight second segment extending outwardly away from said first segment along the front of the oven at one side thereof, the heating element at the outer end of said second segment being bent back through an arc of substantially 90° and presenting a straight third segment extending rearwardly away from said second segment back along said one side of the oven, the heating element at the back end of said third segment being bent back through an arc of substantially 90° and presenting a straight fourth segment which extends past said first segment closely adjacent the plug and substantially completely across the back of the oven, the heating element at the other end of said fourth segment being bent back through an arc of substantially 90° and presenting a straight fifth segment which extends forwardly away from said fourth segment along the opposite side of the oven, the heating element at the forward end of said fifth segment being bent back through an arc of substantially 90° and presenting a straight sixth segment extending inward from said fifth segment along the front of the stove at said opposite side thereof, the heating element at the inner end of said sixth segment being bent back through an arc of substantially 90° short of said first segment and presenting a straight seventh segment which extends substantially parallel to said first segment along the middle of the oven back to the plug.

References Cited in the file of this patent

UNITED STATES PATENTS

| 1,980,719 | Egger | Nov. 13, 1934 |
| 2,762,899 | Lenz | Sept. 11, 1956 |

FOREIGN PATENTS

| 896,833 | Germany | Nov. 16, 1953 |